United States Patent [19]
Porter

[11] 3,887,110
[45] June 3, 1975

[54] DISPENSING METHODS AND APPARATUS

[75] Inventor: Lawrence C. Porter, Palos Verdes Peninsula, Calif.

[73] Assignee: The Upjohn Company, Kalamazoo, Mich.

[22] Filed: Sept. 18, 1972

[21] Appl. No.: 289,858

Related U.S. Application Data

[63] Continuation of Ser. No. 71,144, Sept. 10, 1970, abandoned.

[52] U.S. Cl. .................. 222/16; 141/102; 141/157; 222/63; 222/76
[51] Int. Cl. ............................................. B67d 5/30
[58] Field of Search .............. 222/1, 23, 14, 16, 63, 222/76; 318/696; 141/102, 157; 128/214 E, 214 F

[56] References Cited
UNITED STATES PATENTS 3,303,967  2/1967  Munson ........................ 222/14
3,559,644  2/1971  Stoft .............................. 222/76 X Primary Examiner—Stanley H. Tollberg
Assistant Examiner—John P. Shannon
Attorney, Agent, or Firm—Denis A. Firth; John Kekich

[57] ABSTRACT

Improved methods and apparatus are provided for dispensing precisely a predetermined quantity of material. A reference value is established, preferably in binary terms, and a train of electric pulses is generated which each has a functional relationship to a preselected mass transfer unit of said material being dispensed. The pulses are counted as they are generated, and this count is continually compared with the reference value. When the number of pulses is functionally equal to the reference value, the transfer of material is halted in some suitably abrupt manner.

5 Claims, 5 Drawing Figures

Lawrence C. Porter
INVENTOR

BY FIDLER & BARD

ATTORNEYS

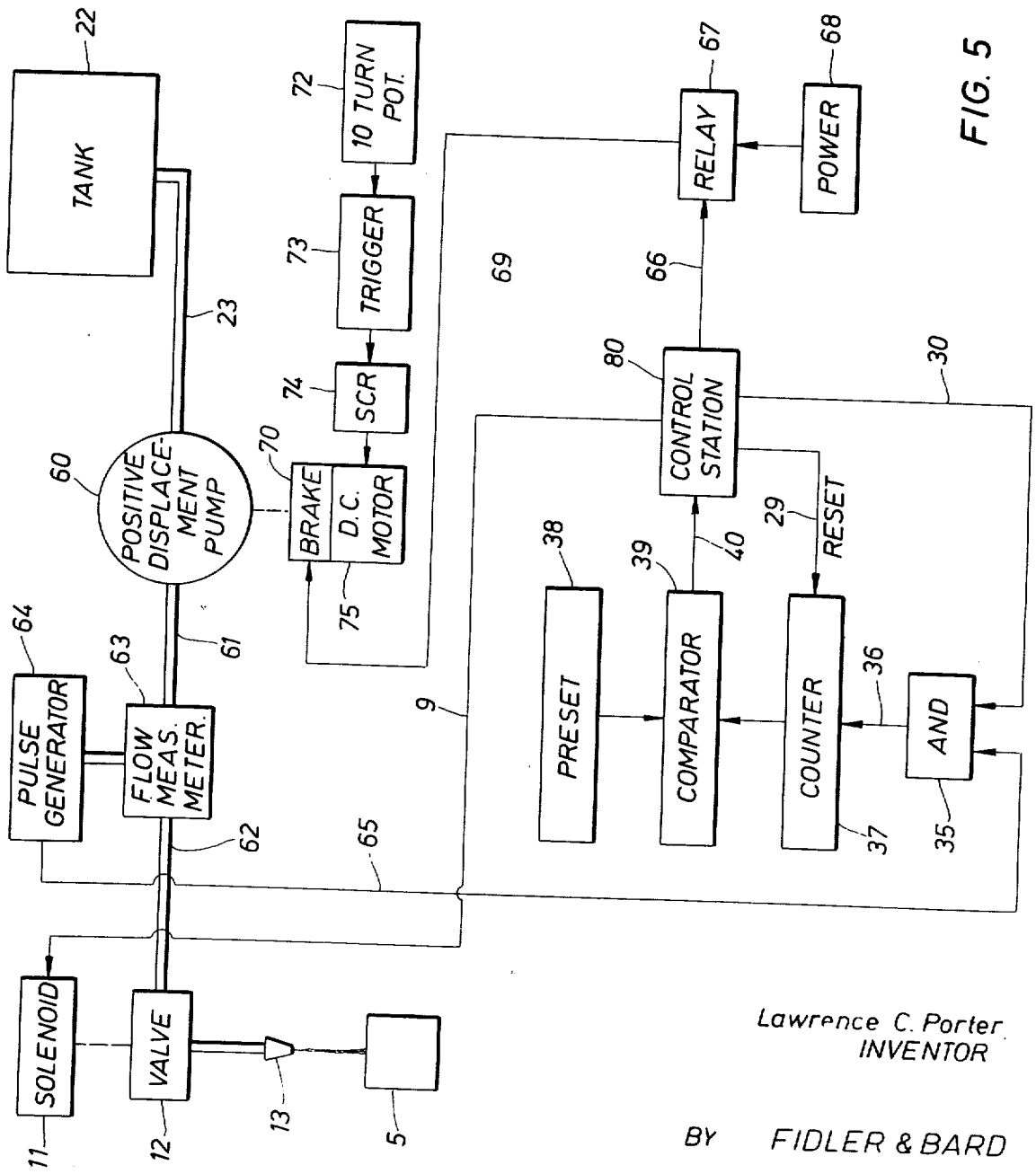

DISPENSING METHODS AND APPARATUS

This is a continuation of Ser. No. 71,144, filed Sept. 10, 1970, now abandoned.

BACKGROUND OF INVENTION

This invention relates to methods and apparatus for dispensing material, and more particularly relates to methods and apparatus for regulating the dispensing of material within extremely precise limits.

Assembly line techniques for dispensing preselected quantities of material are well known. For example, such techniques have long been employed in bottling carbonated beverages wherein it is necessary to inject syrup and carbonated water into each of a great many bottles traveling along an assembly line. Although it is necessary to regulate the proportions of syrup and carbonated water to some extent in order to maintain a generally consistent flavor, there are other industries, such as the packaging of pharmaceuticals, wherein the quantities and proportions must be held within much closer limits of variation. Furthermore, it is often desirable to commingle the components of the mixture in the ultimate container in order to eliminate the necessity of premixing the material before packaging it. Accordingly, this requires strict control over the relative amounts of each ingredient or component injected into each container, as well as control over the total amount of material thus dispensed into each container.

Various different techniques have been developed for dispensing precise quantities of material. Such techniques are extremely delicate, however. Furthermore, the apparatus is usually quite expensive and is difficult to adjust for the purpose of changing the amounts sought to be dispensed. For this reason, those industries which package a variety of different mixtures, or which package the same material in packages of various sizes, are usually required to install and use a plurality of dispensing systems if the proportionality and quantity of the material is critical, or else to acquiesce to lower and more liberal standards.

SUMMARY OF INVENTION

These disadvantages of the prior art are overcome with the present invention, and methods and apparatus are provided herein for dispensing extremely precise preselected quantities of either a liquid or a dry comminuted material.

In a preferred form of the present invention, a digital control system is disclosed, wherein a pump or other flow means is provided for injecting the material, and wherein the pump is driven by a motor. Means is further provided to rotate the pump or motor in precise increments of revolution, whereby the material is dispensed in precise quantities functionally related to the increments of revolution.

Suitable measurement means is preferably included for generating an electrical frequency or pulse train wherein the pulses or functional increments of the signal are each caused to represent a predetermined unit of material being dispensed. A comparison circuit may be provided for continually monitoring the amount of material being dispensed by digitally comparing the incoming frequency or pulse train with a reference value corresponding to the precise quantity of material sought to be dispensed.

The pump motor may be energized by any convenient means such as the output voltage from a silicon controlled rectifier or the like. Thus, a deviation in the actual dispensing rate from the preselected rate may be conveniently corrected by adjusting the output voltage from the rectifier. However, it is preferable for purposes of the present invention to make such adjustments in incremental or digital terms, and thus it is also preferable that the shaft of the potentionmeter which controls the rectifier be rotated incrementally by a stepper motor or the like. The stepper motor, of course, is preferably actuated by a digital control signal which is composed of exactly the number of pulses by which the measurement frequency deviates from the frequency value sought to be established and maintained.

These and other objects and features of the present invention will become apparent from the following detailed description, wherein reference is made to the figures in the accompanying drawings.

IN THE DRAWINGS

FIG. 4 is a functional representation of a further modification of a portion of the structures and techniques illustrated in FIGS. 2 and 3.

FIG. 5 is a functional representation of another control system embodying the concepts of the present invention.

DETAILED DESCRIPTION

Figure 1:
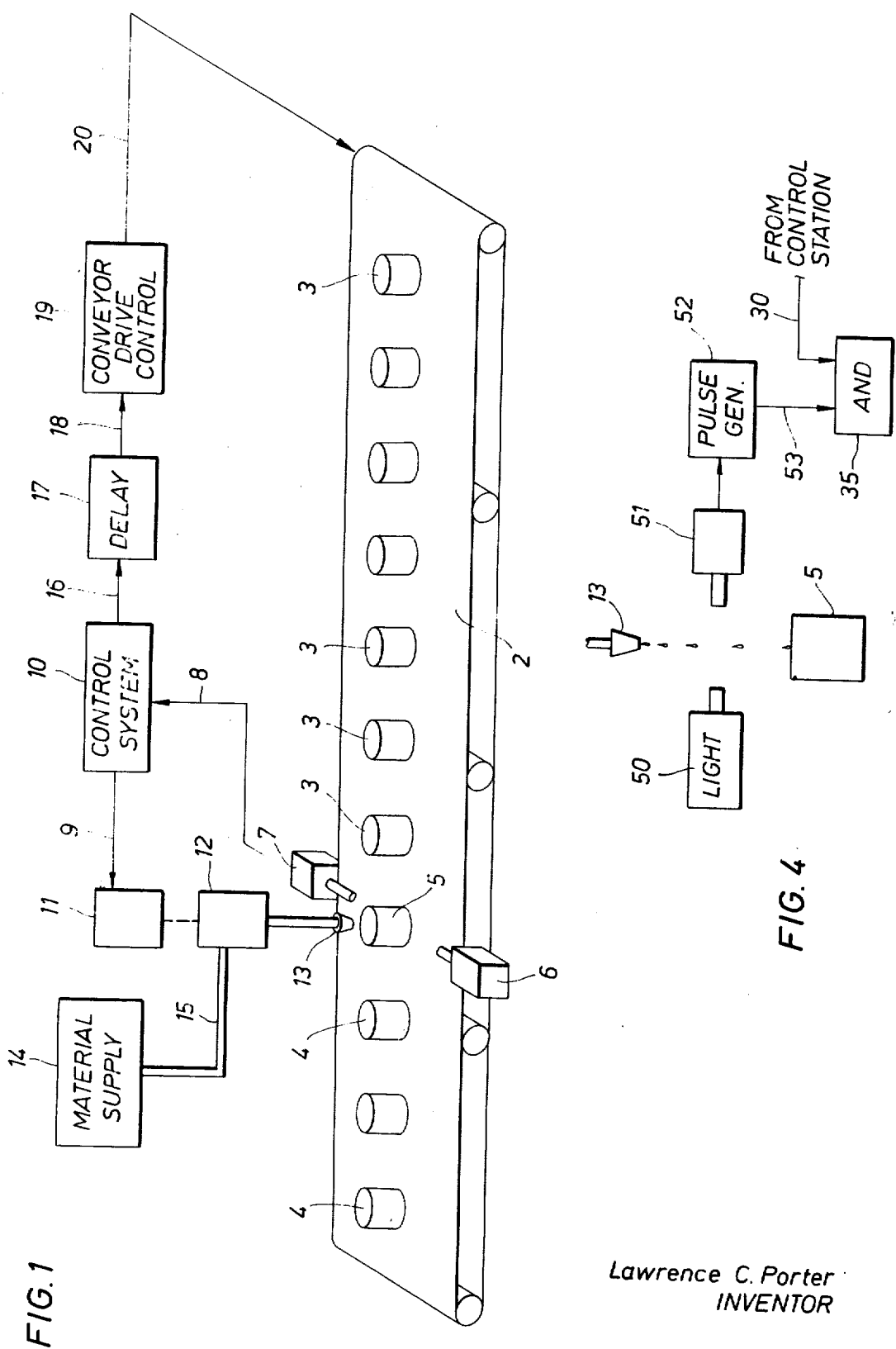
FIG. 1 is a functional representation of an exemplary dispensing system incorporating the concepts of the present invention.

Referring now to FIG. 1, there may be seen a functional representation of one form of dispensing apparatus suitable for use with the present invention, and including a conveyor belt 2 arranged to conduct a linear array of containers to and past a dispensing or filling location. More particularly, the system may include any suitable material supply 14 having a flow line 15 connected to conduct material to a solenoid actuated dispensing valve 12 of conventional design. Depending on the character of the material, the valve 12 may conveniently be provided with a non-drip spout 13 which may be opened and closed by a solenoid 11 which is responsive to a control or actuating signal 9 provided by a control circuit 10.

As represented in FIG. 1, the conveyor 2 is arranged to progressively conduct empty receiving containers 3 to the filling location or station immediately below the spout 13 and between a light source 6 and photoelectric cell 7 of conventional design, and to conduct the filled containers 4 away from this station to a suitable receiving station (not depicted). Thus, the particular container 5 intended to be filled during each dispensing sequence or cycle will actuate the cycle by interrupting the light beam to the photoelectric cell 7 to cause the cell 7 to provide a gating signal 8 to the control circuit 10. This, in turn, causes the control signal 8 to produce a suitable actuating signal 9 to actuate the solenoid 11 to open the valve 12 and to permit material to be discharged into the container 5 which has interrupted the light beam.

It is a particular object of the present invention to cause only a precisely predetermined amount of material to be dispensed into the container 5, and thus it is preferable that none of the discharging material be misdirected. Conventionally, traveling means can be included to cause the valve 12 and spout 13 to move with the conveyor 2 and container 5. It is often inconvenient to utilize traveling means, however, for those dispensing systems wherein the containers 3–5 are small and wherein the time required to fill the container 5 is only a fraction of a second.

An alternative technique for preventing spillage is to stop the conveyor 2 for a suitable interval of time. This also is frequently inconvenient, however, since it tends to produce a relatively jerky movement of the conveyor 2 when the containers 3–5 are small and closely spaced together. Even in those instances when the containers 3–5 are drum-sized, it is undesirable to cyclically and intermittently operate the conveyor 2 if the liquid level in the filled containers 4 is high and if the liquid is of a relatively low viscosity. Otherwise, abrupt and intermittent movement of the conveyor 2 may cause the liquid to spill over the rims of the containers 4.

A further alternative which is useful in those instances wherein there are many containers 3 to be filled which are of a relatively small size and wherein only a relatively small amount of material is to be dispensed during each cycle. Thus, the conveyor 2 need not be disabled since the actuating signal 9 will open the valve 12 only for a preselected time interval which is substantially less than the time during which the container 5 breaks the light beam.

Referring again to FIG. 1, however, it may be seen that the apparatus depicted therein includes provision for halting the conveyor 2 during each fill cycle. In particular, it may be seen that the control circuit 10 is further adapted to generate both the actuating signal 9 which opens the valve 12, and also another actuating signal 16 which is applied to a time delay 17. The time delay 17, of course, is connected to provide a suitable delay or interrupt signal 18 for slowing or disabling the conveyor drive control 19 for a discrete time interval which is at least as great as the dispensing time interval. When the time delay 17 terminates the interrupt signal 18, the conveyor drive 19 will reinstate its driving signal 20, and the conveyor 2 will then carry the container 5 out of the light beam. The control system 10 will have discontinued both actuating signals 9 and 16 not later than termination of the interrupt signal 18, and thus the valve 12 will be closed before the conveyor 2 is reactivated. Accordingly, the conveyor 2 may now conduct the next empty container 3 into the light beam to cause the potoelectric cell 7 to produce an activating signal 8 to the control circuit 10 to repeat the sequence.

Figure 2:
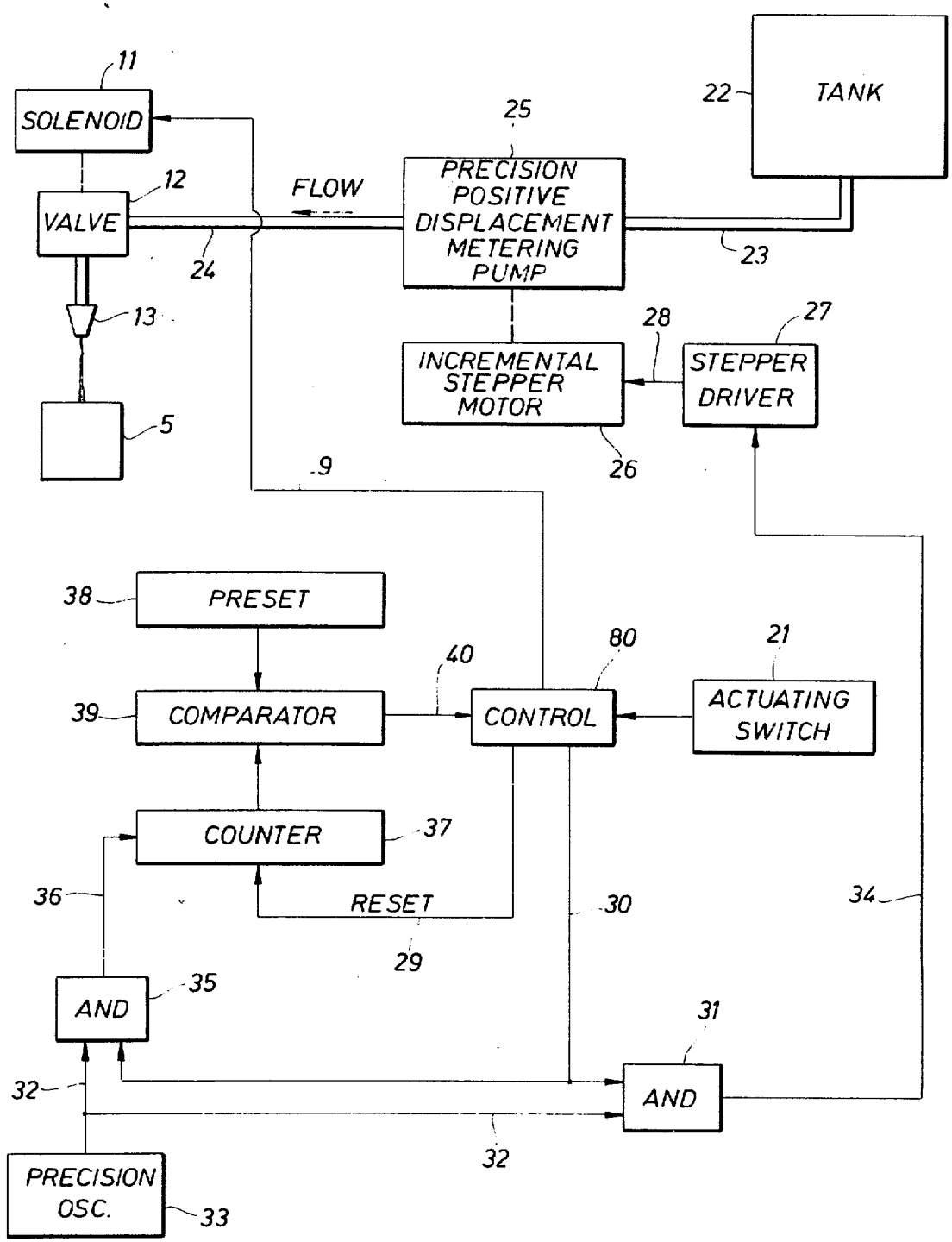
FIG. 2 is a more detailed representation of selected portions of the system depicted generally in FIG. 1, including detailed functional illustration of the control system.

Referring now to FIG. 2, there may be seen a more detailed functional representation of selected portions of the dispensing system depicted in FIG. 1, and in particular the control system 10 which may also be used with other similar types of dispensing systems wherein extremely precise control is sought to be obtained. More particularly, the system may include a tank 22 for holding a suitable supply of material and which may be connected by a flow line 23 to the input side of a suitable positive displacement metering pump 25 or the like. Another flow line 24 may be connected between the input side of the solenoid actuated valve 12 and the output side of the pump 25, and a bidirectional stepper motor 26 may be provided to drive the metering pump 25 in response to a suitable stepping signal 28 generated by a conventional stepper driver circuit 27.

A control circuit or station 80 which may be actuated by any convenient device 21 such as the photoelectric switch 7 depicted in FIG. 1, may be included to generate the actuating signals 9 and 30 which respectively energize the solenoid 11 and one of the inputs of each of two AND circuits 31 and 35. The control station 80 may also be adapted to generate a suitable reset signal 29 for a conventional binary coded decimal counter 37 or the like which is connected between the output of the AND gate 35 and one side of a comparator 39. A conventional preset 38 is coupled to the other side of the comparator 39 which has its output side coupled to the control station 80.

A precision oscillator 33 may be coupled to the other inputs of the two AND gates 31 and 35, and the output side of the AND gate 31 may be coupled to the input of a suitable stepper driver 27 which is coupled to the stepper motor 26.

It will be noted that the oscillator 33 is adapted to provide a continuous output pulse train 32, and that each pulse in the pulse train 32 will correspond functionally to a preselected unit of the material in the tank 22. Thus, the stepper motor is preferably adapted to rotate one step for each such pulse, and the pump 25, in turn, is preferably adapted to transfer one unit of material for each pulse in the pulse train 32. The oscillator 33 may be either fixed or variable with respect to the frequency of its output pulse train 32, whereby the system may be easily recalibrated for dispensing the material ( or other different material) in different preselected quantities.

The pulse train 32 generated by the oscillator 33 is continually applied to one of the two inputs of the two AND gates 31 and 35. Accordingly, when the control station 80 generates the actuating signal 30, as hereinbefore stated, and AND gate 31 will "open" to apply an actuating pulse train 34 to the stepper driver 27 which applies a suitable actuating signal 28 functionally related to the number of pulses 34 passed by the AND gate 31 during its receipt of the actuating signal 30. The stepper motor 26 will then rotate the metering pump 25 in a manner functionally related to the number of pulses 34 delivered to the stepper driver 27, and thus an amount of material functionally related to the number of pulses 34 applied to the stepper driver 27 will be injected through the open valve 12 and spout 13, and into the container 5.

As may further be seen in FIG. 2, the system may include a suitable BCD counter 37, or the like, for counting the output pulses 36 delivered by the other AND gate 35 during the continuance of the actuating signal 30 provided by the control station 80. The counter 37, in turn, is connected to a suitable comparator network 39 having a preset 38. The preset 38 may be adjusted to trigger the comparator 39 when the counter 37 has received a preselected number of pulses 36 corresponding to the number of mass transfer units of material sought to be dispensed into the container 5. Accordingly, when the comparator 39 is triggered, it generates a "turn off" pulse or signal 40 which functions to reset or inactivate the control station 80. At this point, the actuating signals 9 and 30 are discontinued, the valve 12 closes due to de-energization of the solenoid 11, and AND gates 31 and 3T discontinue generating pulses 34 and 36 respectively, and the conveyor 2 may resume its travel if is is controlled in the manner indicated in FIG. 1.

It will be apparent that the pulses 34 and 36 generated or passed by the AND gates 31 and 35, respectively, should be functionally related to the mass transfer units of material sought to be dispensed into the container 5. If the pulses 32 generated by the oscillator 33 are produced at an appropriate frequency, as hereinbefore suggested, the pulses 34 and 36 may be generated at the same frequency. In such an arrangement, the AND gates 31 and 35 will simply open in response to the actuating or gate signal 30 to pass the output of the oscillator 33.

In another aspect of the invention, the time delay 17 may be eliminated, and the conveyor system 2 may be arranged to carry the containers 3–5 uninterruptedly past the spout 13. In such a case, however, the valve 12 and spout 13 is preferably mounted on a suitable traveling cradle, as hereinbefore mentioned, whereby the valve 12 and spout 13 may travel with the moving container 5 during the interval wherein it is receiving material, and whereby it may be shifted back a preselected distance to meet the next oncoming container 3. The actuating switch 21 depicted in FIG. 2 may include the photoelectric cell 7, or may include any other suitable actuating means. In fact, the switch 21 need not necessarily be actuated by the container 5 to be filled, but may be energized by timing means operating to automatically trigger the control station 80 at preselected time intervals correlated with the speed of the conveyor 2.

It will be appreciated by those having experience in this art that the metering pump 25 depicted in FIG. 2 may not, by itself, be sufficiently accurate for purposes of the present invention. Accordingly, there may be seen in FIG. 3 a modified form of the structures and techniques illustrated in FIG. 2, wherein a suitable flow meter 41 has been installed in the flow line 24 to provide a pulse train 42 corresponding to the actual mass transfer units of material passing from the metering pump 25 to the valve 12. As may further be seen, the output frequency 32 from the oscillator 33 is only connected to the AND gate 31, and the pulse train 42 is connected to the AND gate 35. In this arrangement, the AND gate 31 is caused by the gating signal 30 to pass the oscillator frequency 32 to the stepper driver 27, and the comparator 39 now functions to turn off the control station 80 when the counter 35 has counted actual mass transfer units corresponding to the preselected amount of material selected by the preset circuit 38. In other words, in the system depicted in FIG. 3, the dispensing system is responsive to actual amounts of material dispensed, instead of to oscillator pulses which may not precisely relate to the mass transfer units of material actually dispensed.

It is relatively convenient to regulate and establish the shape and amplitude of the output pulses 32 generated by the oscillator 33. Similarly, it is convenient to regulate the shape and amplitude of the pulses 34 produced or passed by the AND gate 31, and this is why it is often preferable to provide a separate actuation circuit such as the oscillator 33 for operating the stepper driver 27. However, it may be convenient in certain instances to eliminate the oscillator 33, and to apply the pulses 42 from the flow meter 41 to the AND gate 31, although this may require the use of amplifying and squaring circuits (not depicted). Further, a suitable starter circuit (also not depicted) may be conveniently included with the stepper motor 26.

Figure 3:
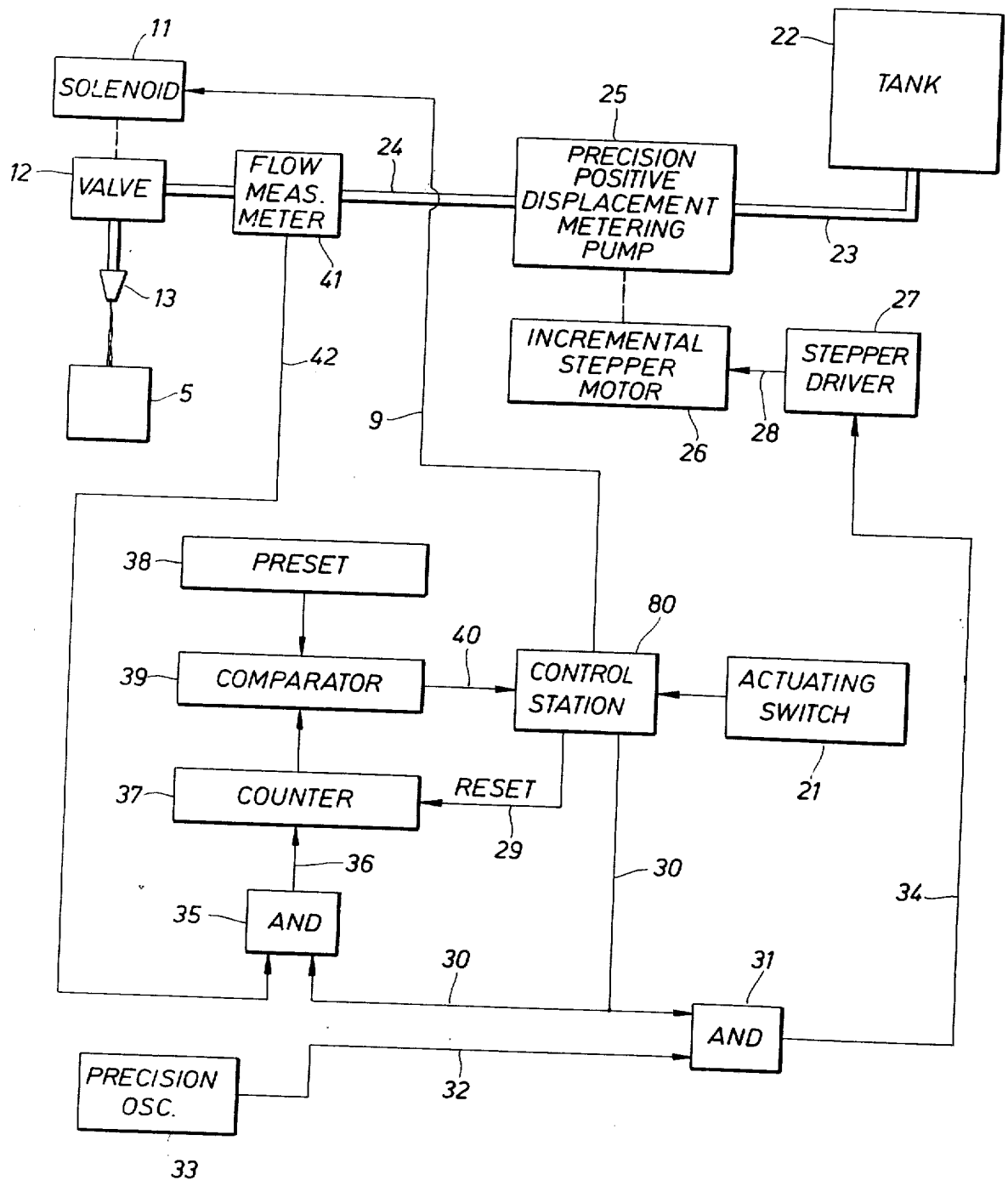
FIG. 3 is a functional representation of a modification of the structures and techniques illustrated in FIG. 2.

In some instances, a flow meter 41 such as that depicted in FIG. 3 may not provide a measurement of sufficient accuracy, especially where the mass transfer unit of measurement is very small. For example, it may be desirable to dispense the material in drops rather than as a stream in order to achieve accurate dispensing of very small volumes or amounts of material. Referring now to FIG. 4, there may be seen a functional representation of a flow measuring or metering circuit suitable for use with systems which dispense the material in drops or other discrete portions, including a light source 50 arranged on one side of the drops of material falling from the spout 13 into the container 5, and further including a suitable photoelectric cell 51 arranged on the other side and actuated by light from the light source 50. As will be apparent, each drop which falls through the light beam from the light source 50 will momentarily interrupt the beam, and each such interruption may be used to provide an electric pulse or other actuating signal to fire a suitable pulse generator 52. Each output pulse 53 from the pulse generator 52 may then be applied to the AND gate 35 (and also to the AND gate 31, if desired) to regulate the system. The size of the drops will accordingly be regulated by conventional techniques, of course, and the system depicted in FIG. 4 will merely indicate the number of drops being discharged from the spout 13.

Referring now to FIG. 5, there may be seen a functional representation of control apparatus which is especially intended to regulate a dispensing system which is designed to handle and transfer large volumes of material. For example, such a system may have a large positive displacement pump 60 which is capable of a discharge rate on the order of 2,000 gallons per minute. Accordingly, a pump 60 of this size may require a 50 hp DC motor 75 which is driven by the output or driving voltage of a conventional silicon controlled rectifier 73 or the like. The rectifier 73, of course, may be adjusted by any suitable adjustment means such as a 10-turn potentiometer 72 and a conventional trigger circuit 73.

As further depicted, a conventional flow line 23 couples the intake side of the pump 60 to the material source such as a tank 22, and a similar flow line 61 may be coupled between the outlet side of the pump 60 and a suitable measuring device such as a flow meter 63 connected to drive a pulse generator 64. Another flow line 62 is provided to connect the output side of the flow meter 63 to the valve 12. Accordingly, the pulse generator 64 will generate a pulse train or frequency 65 which is functionally related to the throughput of the pump 60 rather than to the rotational velocity of the shaft of the motor 75.

Referring again to FIG. 5, the depicted apparatus may include a conventional AND gate 35 having one input responsive to the output frequency 65, and having its output 36 coupled to a binary coded decimal counter 37. A suitable control station 80 is included for applying an actuating signal 30 to the other input of the AND gate 35, a reset signal 29 to the counter 37, an energizing input 9 to the solenoid 11 which actuates the normally closed valve 13, and another energizing signal 66 to a relay 67 which is connected to a power supply 68. The control station 80 is preferably actuated by the output signal 40 from a comparator circuit 39 which is coupled between the outputs of the counter 37 and a suitable preset means 38.

Accordingly, it may be seen in FIG. 5 that the dispensing or fill cycle is initiated when the motor 75 and pump 60 are actuated, and when the control station 80 is caused to generate the aforementioned actuating signals 30 and 9. The valve 12 will be opened by actuation of the solenoid 11, and the material which is flowing through the flow lines 61 and 62 will pass out throuhg the spout 13 and into the container 5. The AND gate 35, on the other hand, will be opened by the receipt of both the frequency 65 and the gating signal 30, and thus a pulse 36 will be applied to the counter 37 for each pulse or digital increment of the frequency 65.

The object of the apparatus depicted in FIG. 5 is to dispense a predetermined number of units of material into the container 5, and thus the function of the preset 38 is to provide a means for triggering the comparator 39 when the counter 37 has received a total number of pulses 36 which corresponds at least functionally to the number of units of material intended to be dispensed into the container 5. Accordingly, the gating signal 30 to the AND gate 35, and the actuating signal 9 to the solenoid 11, will preferably disappear with the appearance of the indicating pulse 40 from the comparator 39. In addition, it is also desirable for the control station 80 to generate a suitable reset signal 29 in response to the indicating pulse 40, and to apply this pulse to the counter 37 to return it to zero.

It will be apparent that it is desirable that the pump 60 be halted as near as possible to the closing of the valve 12. A 50 hp motor 75 requires the assistance of suitable braking means 70, however, which may be either an armature control relay or a conventional braking clutch for the motor shaft. Accordingly, however, the control station 80 may conveniently be adapted to generate an energizing signal 66 in coincidence with the reset signal 29, and to apply this signal 66 to open the relay 67 which is coupled to the power supply 68. Thus, the output of the power supply 68 will be applied to the braking means 70 in the form of a suitable energizing signal 69 whenever the relay 67 is actuated.

The fill sequence may be commenced in any suitable manner, such as by a manually operated switch (not depicted) in the control station 80, or by any of the means illustrated in any of FIGS. 1–4. In addition, however, the actuating switch 21 depicted in FIGS. 2 and 3 may also be included for the purpose of de-energizing the control station 80 and discontinuing the actuating signals 9 and 30 whenever the conveyor 2 is stopped (for example) or whenever the tank 22 becomes empty. The reset signal 29 is generated by the control station 80, however, only in response to the pulse 40 from the comparator 39 which appears only at the conclusion of a complete fill cycle. Accordingly, if the fill cycle is interrupted for any reason before the container 5 has received the predetermined volume of material as established by the preset 38, and if the system is thereafter re-activated, the system will then dispense only the exact balance of the predetermined volume of material. In other words, the counter 37 will not reset of its own accord, but will retain the count then accumulated, and when the pulses 36 again enter the counter 37, it will continue to accept pulses 36 only until it reaches the total count established by the preset 38. Thus, the container 5 then being filled may not be inadvertently overfilled.

It should be noted that, with the present invention, a plurality of different materials may be discharged simultaneously into a container at precise predetermined proportions. Thus, it is unnecessary with the present invention to premix the various materials to achieve the proper proportions.

If a plurality of materials are to be dispensed, it is preferable to employ a separate control system for each material. A separate oscillator 33 may be used with each control system, but it may be desirable to preselect the output frequency of each oscillator relative to the proportions of the mixture, so that each material will be dispensed within the same time interval. Alternatively, a single oscillator may be used to drive two or more separate control systems, but suitable frequency-to-frequency converters must thereupon be employed in each system to adjust the output frequency from the oscillator to the driving frequency corresponding to the proportion of the material to be controlled.

It will further be apparent from the foregoing that various modifications and variations may be made in the structures and procedures described herein without substantial departure from the essential concept of the present invention. Accordingly, it should be clearly understood that the forms of the invention described herein and depicted in the accompanying drawings are exemplary only and are not intended as limitations on the scope of the present invention.

What is claimed is:

1. A system for dispensing a predetermined amount of material into a receptacle or the like, comprising
   pulse generating means for producing electrical actuating pulses,
   gating means interconnected with said pulse generating means and openable for passing said actuating pulses,
   transfer means interconnected with said gating means for dispensing a preselected discrete quantity of said material in response to each actuating pulse received from said pulse generating means,
   counting means interconnected with said gating means for receiving and counting pulses,
   preset means for providing a functional representation of a predetermined number of said actuating pulses,
   comparator means interconnected with said preset and counting means for providing a completion signal when the number of actuating pulses received and counted by said counting means corresponds with said functional representation, and
   control means for opening said gating means for passing pulses to said transfer and counting means and closing said gating means and resetting said counting means in response to said completion signal from said comparator means.

2. The system described in claim 1, wherein said gating means includes
   a first pulse gate interconnected with said transfer means and said pulse generating means and openable in response to said control means for passing actuating pulses to said transfer means, and a second pulse gate interconnected with said counting means and openable in response to said control means for passing pulses to said counting means, said first and second pulse gate both being closeable by said control means in response to said completion signal from said comparator means.

3. The system described in claim 2, wherein said second pulse gate is interconnected with said pulse generating means for passing said actuating pulses to said counting means.

4. The system described in claim 2, wherein said pulse generating means comprises a first pulse generator interconnected with said first pulse gate for producing said actuating pulses passed to said transfer means, monitoring means for providing an indication of each discrete quantity of material dispensed by said transfer means, and a second pulse generator interconnected with said second pulse gate for providing a monitor pulse to said counting means for each of said indications provided by said monitoring means.

5. A system for dispensing a predetermined amount of material into a receptacle or the like, comprising pulse generating means for producing command pulses, material transfer means for dispensing a preselected discrete quantity of said material in correlation with the occurrence of each of said command pulses, preset means for providing a functional representation of a preselected number of said command pulses, measurement means responsive to said command pulses for providing a functional indication of each discrete quantity of material dispensed by said transfer means, counting means for counting said functional indications provided by said measurement means, and comparator means interconnected functionally with said counting and preset means for providing a signal indicative of correspondence of the number of indications received by said counting means and said representation provided by said preset means.

* * * * *